United States Patent [19]

Nishio et al.

[11] Patent Number: 4,595,042
[45] Date of Patent: Jun. 17, 1986

[54] PNEUMATIC TIRE WITH LUGS

[75] Inventors: Hideaki Nishio, Wako; Nobuo Shimizu, Kawagoe, both of Japan

[73] Assignee: Bridgestone Corporation, Tokyo, Japan

[21] Appl. No.: 688,158

[22] Filed: Dec. 31, 1984

[30] Foreign Application Priority Data

Mar. 28, 1984 [JP] Japan .............................. 59-44781[U]

[51] Int. Cl.$^4$ ............................................. B60C 11/11
[52] U.S. Cl. ................................................ 152/209 B
[58] Field of Search ........... 152/209 B, 209 D, 209 R; D12/140, 147, 148, 149, 150, 136

[56] References Cited

U.S. PATENT DOCUMENTS

| D. 144,122 | 3/1946 | MacKusick et al. | D12/147 |
| 4,131,148 | 12/1978 | Bertazzoli et al. | 152/209 B |
| 4,383,567 | 5/1983 | Crum et al. | 152/209 B |

FOREIGN PATENT DOCUMENTS

| 1202282 | 8/1970 | United Kingdom . | |
| 1236335 | 6/1971 | United Kingdom | 152/209 R |

Primary Examiner—Michael Ball
Attorney, Agent, or Firm—Cushman, Darby & Cushman

[57] ABSTRACT

A pneumatic tire, wherein the tire includes on the tread portion thereof a series of lugs arranged circumferentially of the tire and a series of grooves arranged only one between each next adjacent pair of the lugs, comprising: a series of projections each of which is arranged in its corresponding groove between the lugs and smaller in height than the lug. Each projection is spaced from the lug a predetermined distance circumferentially of the tire and extends inwardly from its lateral edge and terminates short of the midcircumferential centerline of the tire and further extends outwardly from the lateral edge thereof and terminates in the side wall of the tire.

9 Claims, 3 Drawing Figures

4,595,042

PNEUMATIC TIRE WITH LUGS

FIELD OF THE INVENTION

The present invention relates to pneumatic tires, and more particularly to the tread portion of a pneumatic tire used on farm tractors and like vehicles wherein the tire includes on the tread portion thereof a plurality of lugs and projections arranged between each next adjacent pair of the lugs.

SUMMARY OF THE INVENTION

In accordance with the present invention, there is provided a pneumatic tire, wherein the tire has a rotational axis thereof and a midcircumferential centerline between the lateral edges of the tread portion and includes, on the tread portion thereof, a series of lugs arranged circumferentially of the tire and a series of grooves arranged only one between each next adjacent pair of the lugs, comprising: a series of projections each of which is arranged in its corresponding groove between the lugs and smaller in height than the lug; the each projection being spaced from the lug a predetermined distance circumferentially of the tire and extending inwardly from its lateral edge and terminating short of the midcircumferential centerline and further extending outwardly from the lateral edge thereof and terminating in the side wall of the tire, and being gradually increased in height from the area of said midcircumferential centerline toward said lateral edge thereof and gradually decreased from the lateral edge toward the side wall of the tire.

DESCRIPTION OF THE PRIOR ART

Conventionally, a pneumatic tire used on farm tractors and like vehicles includes on the tread portion thereof a plurality of deep lugs which extend radially outwardly of the tire and are arranged circumferentially of the tire, in order to afford good tractive force of the tire on soft or muddy ground. For the purpose of producing such tires with deep lugs, a molding having deep recessions corresponding to the deep lugs of the tire to be produced has been thus far employed. In the molding with deep recessions, an uncured pneumatic tire, which comprises a tread portion, a breaker ply and a carcass each having an even thickness in the circumferential and lateral directions of the tire, is cured by heating the exterior of the molding and the radially inner circumference of the uncured tire under pressure applied to the radially inner circumference of the uncured tire. As the uncured tire is heated under pressure and lowers its viscosity, rubber of the tread portion of the tire flows along and on the deep recessions of the molding. However, in such a molding having deep recessions, a large flow of the uncured rubber occurs, because of the deep recessions of the molding, in root portions of the deep lugs on the tread portion, while only a small flow of the uncured rubber occurs in the parts of grooves arranged on the tread portion between adjacent deep lugs. This uneven rubber flow over the circumference of the tire causes a drawback that the tread portion of the tire produced by the molding is not even in its radial thickness over the circumferential direction of the tire. Another drawback is also caused that spacing between cords embedded in the carcass and the breaker ply necessarily becomes narrow or wide because flow of rubber also occurs in the carcass and the breaker ply as the rubber of the tread portion flows toward the direction of the deep recessions of the molding. If a pneumatic tire is produced by using the molding with deep recessions, the tread portion of the tire will be varied in its radial thickness over the circumference of the tire and further cord spacing will be varied in the carcass and the breaker ply. Because of these unevennesses of the radial thickness of the tread portion and of the cord spacing in the carcass and breaker ply, the pneumatic tire, when inflated under normal inflation pressure and loaded to design load, excessively inflates at the parts of the grooves which are thin in their radial direction and at the parts wherein the cord spacing in the carcass is wide, and further at the side portion thereof. This excessive inflation provides unpleasing appearance of the tire. The tire of the kind, which has an uneven thickness of the tread portion and an uneven cord spacing in the carcass or in the breaker ply, further encounters another drawback in that since tensile stresses are remained in outer surfaces of the grooves between the deep lugs, the tire, when subjected to a road cut or side cut, grows rapidly the road cut or side cut.

On the other hand, in view of the drawbacks described above, it has been proposed that the tread portion of the tire is designed to have a large thickness over the entire width between adjacent deep lugs in the shoulder portion of the tire. In this case, however, since the deep lugs are in reality decreased in height because of the large thickness of the tread portion, amount of mud received between the lugs is reduced, thereby reducing critically on soft or muddy ground tractive force of the tire resulting from reactive force from mud. The tire with the thickened tread portion further increases bending rigidity of the lug. Another drawback is, therefore, encountered in this tire in that the mud received between lugs cannot be readily dropped into ground since the reactive force from mud is not sufficient to bend the lug of the increased bending rigidity. Furthermore, production of the tire having a thickened tread portion is too expensive since the amount of rubber to be used is increased.

It is accordingly one object of the present invention to eliminate unevennesses of the radial thickness of the tread portion and of the cord spacing in the carcass and breaker ply.

It is another object of the present invention to provide pleasing appearance of the tire.

It is a further another object of the present invention to prevent growth of road cut or side cut when the tire is subjected to the road cut or side cut.

It is a still further another object of the present invention to enhance tractive force of the tire on soft or muddy ground.

BRIEF DESCRIPTION OF THE DRAWING

The features and advantages of a pneumatic tire in accordance with the present invention will be more clearly understood from the following description taken in conjunction with the accompanying drawings in which.

DESCRIPTION OF THE PREFERRED EMBODIMENT

Figure 1:
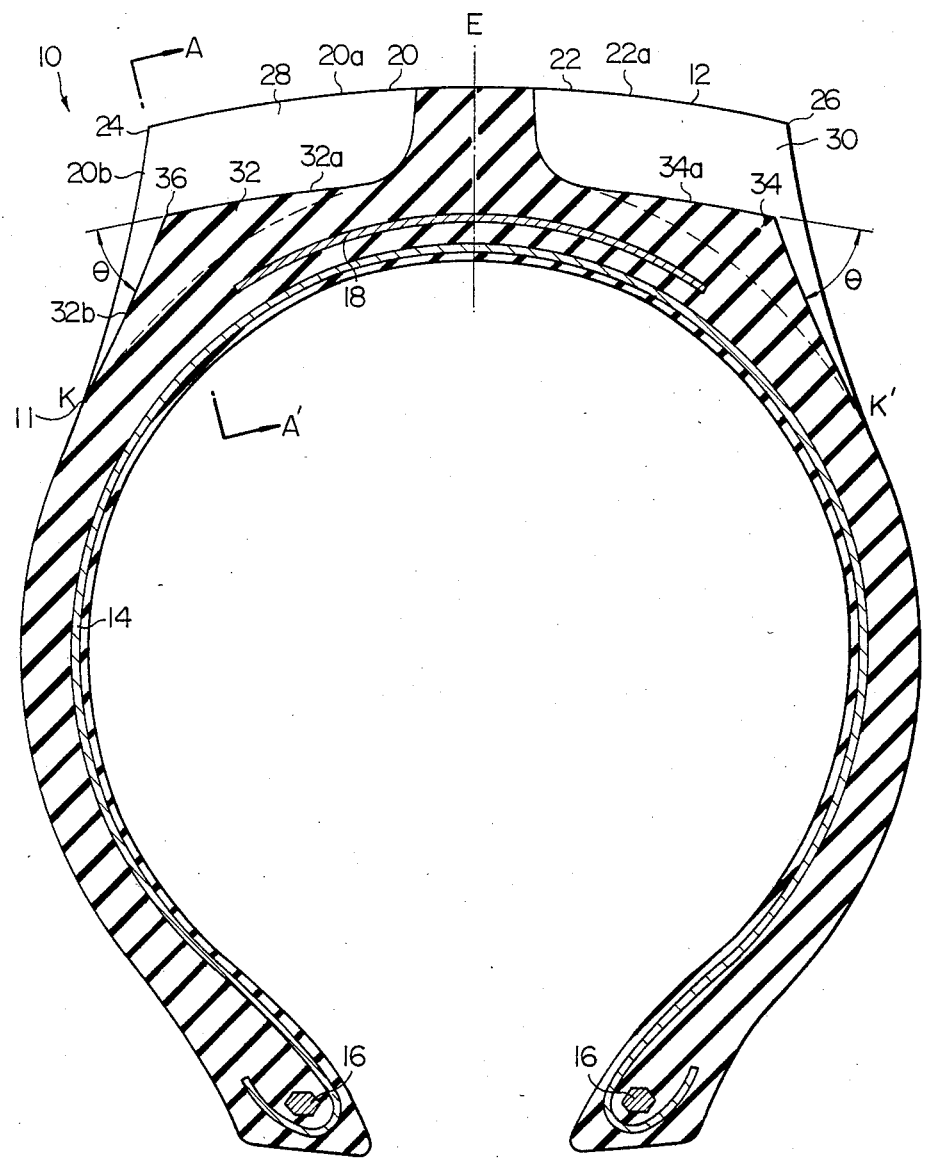
FIG. 1 is a vertical sectional view showing the pneumatic tire constructed in accordance with the present invention.

With reference to the drawings and in particular FIG. 1, there is shown a pneumatic tire 10 constructed in accordance with the present invention. The pneumatic tire 10 comprises a traction portion or tread portion 12 overlying a cord reinforced carcass 14 which in turn terminates in beads 16 at its radially inner extremities. The pneumatic tire 10 further comprises at least one belt or breaker ply 18 disposed between the tread portion 12 and the cord reinforced carcass 14. The tread portion 12 comprises first and second series of lugs 20 and 22 which are arranged circumferentially of the tire 10 on the tread portion 12. Each lug in the first series of the lugs 20 on one side of the tire 10 is substantially identical to each lug in the second series of the lugs 22 on the other side of the tire 10. Each lug 20 on one side of the tire 10 extends from a lateral edge 24 of the tread portion 12 substantially laterally of the tread portion 12 across a midcircumferential centerline E of the tread portion 12 which lies on the ground contacting surface of the tread midway between the lateral edges of the tread portion 12 and is contained in a plane which is perpendicular to the rotational axis of the tire 10. Likewise, each lug 22 on the other side of the tire 10 extends from a lateral edge 26 of the tread portion 12 substantially laterally of the tread portion 12 across the midcircumferential centerline E. On one side of the tread portion 12, there is also a first series of grooves 28 arranged circumferentially of the tire 10 between each adjacent pair of the lugs 20. Likewise, on the other side of the tread portion 12, there is also a second series of grooves 30 arranged circumferentially of the tire 10 between each adjacent pair of the lugs 22.

The tread portion 12 of the present invention further comprises first and second series of projections 32 and 34 provided in the first and second series of grooves 28 and 30, respectively. Each projection in the first series of the projections 32 are substantially identical to each projection in the second series of the projections 34, so that only the projection in the first series of projections 32 is described hereinafter. Each projection 32 is arranged in its corresponding groove 28 and smaller in height than the lugs 20. Each projection 32 has an outer curved end face 32a extending over its entire length in substantially parallel substantially relationship to an outer curved end face 20a of the lug 20, and is spaced from the lugs 20 a predetermined distance circumferentially of the tire 10. The longitudinal centerline of each of the projection 32 is in substantially parallel relationship to the longitudinal centerline of the lug 20. The projection 32 extends inwardly from its lateral edge 36 and terminates short of the midcircumferential centerline E of the tread portion 12, and further extends outwardly from the lateral edge 36 and terminates in the side wall 11 of the tire 10, as seen from FIG. 1. The height of the projection 32 is reduced to zero at both the area of the midcircumferential centerline E and the side wall 11 of the tire 10.

Figure 2:
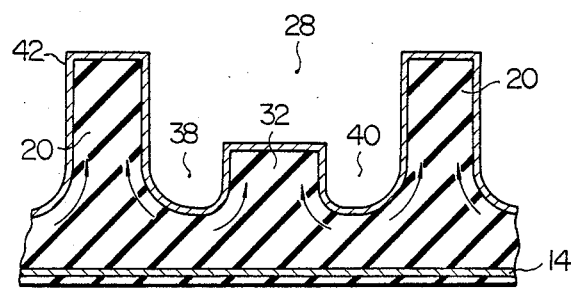
FIG. 2 is a view showing flow of rubber in the tread portion in a molding during vulcanization of the tire in accordance with the present invention.

Referring to FIG. 2, a pair of grooves 38 and 40 are formed in the both sides of each projection 32. The base or bottom lines of the grooves are indicated by a phantom line K—K' shown in FIG. 1. As will be understood from FIG. 1, the height of the projection 32 or the depth of the groove 38 or 40 is gradually increased from the area of the midcircumferential centerline E of the tread portion 12 toward the lateral edge 36 of the projection 32.

Figure 3:
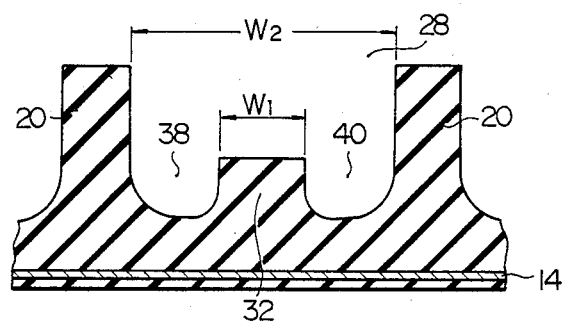
FIG. 3 is an enlarged view taken substantially along the line A—A in FIG. 1 and showing the arrangement and construction of lugs and projection of the tire constructed in accordance with the present invention.

It is preferred that an angle $\theta$ defined by the line tangential to the outer curved end face 32a of the projection 32 and the line on an outer side face 32b of the projection 32 lie between 60 and 90 degrees. In the case that the angle $\theta$ is less than 60 degrees, since the height of the projection is decreased, the projection minimizes protection effect of the groove and decrement effect of rubber flow of the tread portion into a molding during vulcanization of the tire. On the other hand, in the case that the angle $\theta$ is more than 90 degrees, since the height of the projection is increased, the projection increases generation of heat thereof and further raises production cost of the tire because of the increment of rubber to be used. It is also preferred that the outer side face 32b of each of the projection 32 is located short of a plane in which the outer side face 20b of the lug 20 lies. It is noted that each projection 32 may extend in substantially parallel relationship to the rotational axis of the tire 10. It is also preferred that as shown in FIG. 3, the ratio of a width $W_1$ of the outer end face 32a of the projection 32 to a width $W_2$ of the groove 28 between two adjacent lugs 20 be between 0.3 and 0.7. The best ratio should be between 0.45 and 0.55. In the case that the ratio is less than 0.3, the width $W_1$ of the outer end face 32a of the projection 32 is narrowed, so that the narrowed projection minimizes prevention effect of uneveness of the cord spacing in the carcass and breaker ply and protection effect of the carcass from cut. On the other hand, in the case that the ratio is more than 0.7, the width $W_2$ of the groove 28 between two adjacent lugs 20 becomes too narrow and bending of the lug is reduced, so that the reduced bending of the lug minimizes tractive force of the tire.

In FIG. 2, rubber flow of the tread portion 12 in the root portions of the lugs 20 and projection 32 is described hereinafter in accordance with the present invention during vulcanization of the tire.

An unvulcanized pneumatic tire is vulcanized in a molding 42 by heating the exterior of the molding and the radially inner circumference of the tire under pressure applied to the radially inner circumference of the tire. The pneumatic tire comprises a tread portion, a breaker ply and a carcass each having an even thickness in the circumferential and lateral directions of the tire. As the uncured tire is heated under pressure and lowers its viscosity, rubber of the tread portion of the tire flows in the molding as seen from FIG. 2. In the present invention, as the projection 32 is provided between each adjacent pair of the lugs 20, rubber flow occurs not only in the direction of the lug 20 but also in the direction of the projection 32. This rubber flow into the recesses corresponding to the projection 32 can eliminate unevennesses of the radial thickness of the tread portion and of the cord spacing in the carcass and breaker ply, and further can provide pleasing appearance of the tire and prevent growth of road cut or side cut when the tire is subjected to the road cut or side cut. In case that a large tractive force is exerted on the lug 20 in the circumferential direction of the tire, as the projection 32 is spaced a predetermined distance from the lug 20 circumferentially of the tire, the lug 20 can sufficiently bend in the circumferential direction of the tire, so that the mud received between lugs can be readily dropped into ground. This enhances tractive force of the tire on soft or muddy ground when the tire is in traction.

What is claimed is:

1. A pneumatic tire, wherein the tire has a rotational axis thereof and a midcircumferential centerline between the lateral edges of the tread portion and includes, on the tread portion thereof, a series of lugs arranged circumferentially of the tire and grooves arranged between said adjacent lugs, comprising:

projections each of which is arranged in its corresponding groove between said lugs and smaller in height than said lug;

said each projection being spaced from said lugs a predetermined distance circumferentially of the tire and extending inwardly from its lateral edge and terminating short of said midcircumferential centerline and further extending outwardly from said lateral edge thereof and terminating in the side wall of the tire, and being gradually increased in height from the area of said midcircumferential centerline toward said lateral edge thereof and gradually decreased from the lateral edge toward the side wall of the tire.

2. A pneumatic tire as set forth in claim 1, wherein the longitudinal centerline of each of said projection is in substantially parallel relationship to the longitudinal centerline of said lug.

3. A pneumatic tire as set forth in claim 1, wherein each said projection has an outer curved end face extending over its entire length in substantially parallel relationship to an outer curved end face of said lug, and an outer side face located short of a plane in which an outer side face of said lug lies.

4. A pneumatic tire as set forth in claim 1, wherein each said projection has an outer curved end face extending over its entire length in substantially parallel relationship to an outer curved end face of said lug, and an outer side face located short of a plane in which an outer side face of said lug lies.

5. A pneumatic tire as set forth in claim 3, wherein an angle defined by the line tangential to said outer curved end face of said projection and the line on said outer side face of said projection is between 60 and 90 degrees.

6. A pneumatic tire as set forth in claim 4, wherein an angle defined by the line tangential to said outer curved end face of said projection and the line on said outer side face of said projection is between 60 and 90 degrees.

7. A pneumatic tire as set forth in claim 5, wherein a ratio of a width of said outer end face of said projection to a width of said groove between said lugs is between 0.3 and 0.7.

8. A pneumatic tire as set forth in claim 6, wherein a ratio of a width of said outer end face of said projection to a width of said groove between said lugs is between 0.3 and 0.7.

9. A pneumatic tire as set forth in claim 1, wherein the height of said projection is reduced to zero at both the area of said midcircumferential centerline and said side wall of the tire.

* * * * *